United States Patent [19]
Everett et al.

[11] 4,439,349
[45] Mar. 27, 1984

[54] MESOPOROUS CARBONS

[76] Inventors: Douglas H. Everett, 35 Downleaze, Bristol, BS9 LLX; Stephen G. Bligh, 33 Tennyson Ave., Twickenham, Middlesex, TWI 4QX; Fernando Rojas, Flat 8, Sinclair House, Clifton Rd., Bristol 8, all of England

[21] Appl. No.: 336,396

[22] PCT Filed: Apr. 28, 1981

[86] PCT No.: PCT/GB81/00076
§ 371 Date: Dec. 28, 1981
§ 102(e) Date: Dec. 28, 1981

[87] PCT Pub. No.: WO81/03167
PCT Pub. Date: Nov. 12, 1981

[30] Foreign Application Priority Data
Apr. 28, 1980 [GB] United Kingdom ............... 8013932

[51] Int. Cl.$^3$ ................ B01J 21/18; C01B 31/02
[52] U.S. Cl. ................ 502/180; 264/29.1; 423/445; 423/449
[58] Field of Search ............... 252/421, 444; 423/445, 423/448, 449; 264/29.1

[56] References Cited
U.S. PATENT DOCUMENTS
4,029,600 6/1977 Schmitt .
4,081,370 3/1978 Schmitt .
4,118,341 10/1978 Ishibashi et al. ............... 252/421
4,263,268 4/1981 Knox et al. ............... 252/444

FOREIGN PATENT DOCUMENTS
1536715 12/1978 United Kingdom .

Primary Examiner—Delbert E. Gantz
Assistant Examiner—Anthony McFarlane
Attorney, Agent, or Firm—Cushman, Darby & Cushman

[57] ABSTRACT

The disclosed invention relates to mesoporous carbon which is useful as a catalyst or adsorbent for large organic molecules. Said carbon composition comprises a regular assembly of carbon particles thus allowing an accurate pre-determination of the size and size disbtribution of the pores and creating less tortuous pathways of interconnected pores. A method of preparation of said mesoporous carbon has been disclosed.

12 Claims, 3 Drawing Figures

MESOPOROUS CARBONS

This invention relates to mesoporous and wider pore carbons which are useful as supports for catalysts or as adsorbants for larger organic molecules, for example aromatic molecules. It also relates to a method for making mesoporous carbons.

Hitherto adsorbant carbons such as activated charcoals have been made by carbonising for example coal, peat, wood or coconut shell to produce a predominantly carbon substrate and then treating the substrate with an oxidising agent to create adsorbant pores in the carbon. Pores created in this way have a wide variety of sizes ranging from micropores (ie having diameters well below 2 nm) through mesopores (ie having diameters of from 2 to 80 nm or more conventionally 2 to 50 nm) to macropores (ie having diameters well above 100 nm). Neither the size of pores created nor the distribution of pore sizes can be pre-determined accurately because a continuing treatment by the oxidising agent not only enlarges existing pores but it also creates new micropores. Accurate pre-determination of pore size and pore size distribution are important because both influence the performance of supported catalysts or adsorbtion reaction.

British patent specification No. 1 536 715 describes an attempt to produce mesoporous carbons having a pre-determinable narrow range of pore sizes. This is done by packing particles of furnace black or channel black in a polymeric binder so that the spaces between adjacent packed particles are of mesoporous size. The binder is then carbonised to render the packed assembly form-stable. However, the pore size and pore size distribution obtained in this way are not accurately pre-determinable partly because the particle sizes of carbon blacks vary over wide ranges even after sieving and partly because GB No. 1 536 715 does not provide means for packing the carbon particles in a regular assembly. A further consequence of irregular packing is that the pathways created by interconnected pores are highly tortuous owing to the irregular location of the adjacent particles which define the pores. High tortuosity inhibits the flow of molecules through the pathways. Also in practice high tortuosity restricts the size of molecules which can flow usefully to below the maximum size of molecule which would theoretically make a clearence fit in a pathway.

An object of this invention is to provide an adsorbant wide pore (especially a mesoporous) carbon comprising a more regular assembly of carbon particles so allowing more accurate pre-determination of the size and size distribution of the pores and creating less tortuous pathways of interconnected pores. A further object is to provide an adsorbant wide pore carbon having a pre-determined degree of regularity. Another object is to provide a method for making such adsorbant wide pore carbons and to provide a method for pre-determining the degree of regularity in the assembly of carbon particles.

Accordingly this invention provides an adsorbant wide pore carbon comprising a form-stable assembly of a family of contiguous spheroidal (preferably spherical or oblate spherical) carbon particles wherein the surfaces of adjacent contiguous particles define interstitial pores characterised in that (a) the maximum diameters of at least 90% (preferably at least 95%) by number of that particles of the family lie in the range 8 to 3000 (preferably 50 to 400) nm, (b) the root mean square deviation of the maximum diameters of the particles of the family is less than 15% (preferably less than 5%) and (c) in at least one zine of the adsorbant carbon, particles are close packed to an extent that the volume of interstitial pores in the zone is from 18 to 30% (preferably 23 to 28%).

Often when such a carbon is provided with a smooth surface it is very lustrous which is indicative of the regularity of the carbon particles in the assembly which in turn implies a low tortuosity of pathways created by interconnected interstitial pores. The size of the pores can be changed in a pre-determinable way by selective variation of the size of the particles.

Close packing of perfect spheres is defined by A. F. Wells in the book "Structural Inorganic Chemistry" fourth edition (pages 130 and 133) published by the Clarendon Press of Oxford in 1975. The contents of these pages are herein incorporated by reference. Briefly spheres pack closely in two basic arrangements, namely cubic close packed or hexagonal close packed. The surfaces of adjacent contiguous spheres define two types of inter-connected interstitial pores, namely cuspidate tetrahedral or cuspidate octahedral pores. The size of the pores is characterised by the diameter of the largest sphere which can just be accommodated in the pore and for a tetrahedral pore this diameter is 0.255 d and for an octahedral pore it is 0.414 d where d is the diameter of the close packed spheres. Access from one pore to an interconnected pore is via a cuspidate triangular window or foramen defined by the surfaces of three contiguous close packed spheres. The useful size of a foramen is characterised by the diameter of the largest sphere which could make a notional clearance fit in the foramen. This diameter is 0.155 d. The useful size of a foramen is a dimension of major importance in that it has a major affect on the ability of material to diffuse into and out from the interstitial pores. Fully regular close packing may comprise essentially all cubic or all hexagonal close packing or a mixture of the two.

The volume of the interstitial pores in a cubic or hexagonal close packed assembly of perfect spheres of equal size is approximately 26% of the total volume of the assembly. If contiguous perfect spheres of equal size are packed with increasing randomness, then the volume of the interstitial pores increases. When they are packed totally randomly, the volume of the pores reaches a theoretical maximum of 37%. Hence the volume of the interstitial pores is indicative of the regularity of the packing. Volumes greater than 37% can occur if the contiguity of the packed spheres is disrupted or if the shape of packed particles varies from spherical to spheroidal. Likewise volumes much less than 26% can occur if the shape of the packed particles varies from spherical to spheroidal as may occur if the particles are deformed at their points of contiguity by interactions which keep the assembly form-stable. For example sintering together of adjacent particles may cause them to become oblate and in a three dimensionally sintered assembly, particles may be oblate about mutually orthogonal pairs of poles. Preferably any reduction in the volume of the assembly and hence of the pores brought about by such sintering should be less than 25% of the volume achieved with perfect spheres. Adjacent particles may also be held together by chemical bonding including van der Waals' forces.

Defects may occur in the structure of an assembly and so pore volume may only be characteristic of one or more zones of an adsorbant carbon.

In modification of the invention, the regularity of the assembly is disrupted to an extent such that the volume of the interstitial pores is from above 30 or to 40% of the volume of the zone. One way in which a pre-determinable disruption can be achieved is to introduce one or more extra families of spheroidal carbon particles into the assembly, each family comprising particles having the same range of maximum diameters and the same range of root mean square deviations of maximum diameters as specified for the unmodified invention but wherein the number average maximum diameter of the particles of one family differs from that of any other family. Preferably the number average maximum diameter of the largest family (ie the family comprising the largest number of particles) should not differ from that of any other family by more than ±30% (especially ±10%). Preferably the numerically largest family should provide at least 85% (more preferably 95%) by volume of the carbon in a zone of the adsorbant carbon. By introducing particles of one or more pre-selected different ranges of size into the assembly, the regularity of the assembly can be disrupted in a way which is to a large extent pre-determinable and in particular the degree of tortuosity of pathways in a zone can be varied. Also the introduction of dissimilar particles complicates the close packing arrangements by allowing hybrid close packing arrangements as described on pages 131 to 133 of the book by Wells.

This invention also provides a method for making a wide pore adsorbant carbon characterised in that (a) a colloidal dispersion of a family of spheroidal (preferably spherical) particles of carbonisable organic polymer is formed in a liquid wherein the maximum diameters of at least 90% (preferably at least 95%) by number of the particles of the family lie in the range 10 to 3500 (preferably 58 to 230)nm and the root mean square deviation of those maximum diameters is less than 15% (preferably less than 5%), (b) the particles are caused to deposit from the liquid by a packing force exerted on them, (c) the deposited paticles are heated to a temperature which is below the softening point of the polymer but which is high enough to cause at least partial degradation of the polymer and thereby create a form-stable assembly of particles and (d) the form-stable assembly is heated to ensure complete carbonisation of the polymer.

The particles may be caused to deposit from the liquid by for example centrifuging the dispersion in which case the packing force is a centripetal force or by evaporation of the liquid in which case the packing force is exerted by the surface tension of the residual quantities of liquid just prior to completion of the evaporation. Yet a further method for causing the particles to deposit comprises forcing the liquid through a porous membrane by means of direct hydrostatic pressure. The particles are deposited and packed on the membrane. It seems probable that provided the particles are speroidal with maximum diameters of less than 3500 nm, then Brownian motion confers enough mobility on them while in dispersion to enable their strong mutual repulsions to guide them towards assembly under the influence of the packing force. The packing force may be any compression which does not destroy the particles. For example in may be as low as that generated by their own weight but typical compressive forces used when generated by surface tension are from 20 to 40 bar and typical compressive forces used when generated hydrostatically are from 1 to 100 (preferably 5 to 65) bar.

Provided at least the partial degradation of the polymer is performed at a temperature below that at which the polymer softens so that its particles are substantially deformed, then the deposit can be made sufficiently form-stable to permit full carbonisation of the particles without major unpredictable disruption of the regularity of the assembly. This form-stability of the degraded particles is enhanced if the polymer is capable of cross-bonding even if cross-bonding only occurs as a result of the degradation. Generally cross-bonding will be chemical cross-linking but it may also be for example by ionic attraction or by crystallite formation.

By centrifuging carefully (for example using speeds of 800 to 1400 revolutions per minute and a radius of revolution of 5 cms) or by slow evaporation (for example evaporation carried out at least 9° C. and preferably at least 40° C. below the normal boiling point of the liquid) it is possible to achieve a cubic and/or hexagonal close packed assembly. By depositing under progressively more disturbed conditions it is possible to introduce increasing pre-determinable amounts of disruption into the deposited assembly which can be retained in the fully carbonised assembly. Controlled disturbance can be achieved by for example centrifuging a partially flocculated colloidal dispersion such as occurs when small amounts of electrolyte are added to a charge-stabilised colloid or when, in the case of a sterically-stabilised colloid, the composition of the dispersing liquid is changed. Alternatively controlled disturbance can be achieved by evaporation at temperatures progressively nearer the boiling point of the liquid.

A further method of introducing pre-determinable disruption into the deposited assembly and hence into the corresponding carbonised assembly is to use a polymodal (preferably a bimodal) colloidal dispersion. A polymodal dispersion comprises two or more families of spheroidal particles each family having a number average maximum spheroid diameter which is different from that of the other families. Deposition from a polymodal dispersion produces a deposited assembly which is disrupted in a pre-determinable way by the presence of particles of different ranges of sizes. In this way an even wider range of pore sizes can be produced.

Preferably the carbonised assembly is heated to a temperature of from 700° to 3000° C. (especially 1000° to 2000° C.) to close micropores.

The colloidal dispersions may be prepared by conventional techniques including ultra-sonic dispersion or polymerisation in the dispersing liquid (which may be aqueous or non-aqueous) until colloidal particles of the required size have been grown. Where necessary the dispersion may be stabilised by the use of colloidstabilisers sometimes known as protective colloids), for example a block copolymer of polystyrene with terminal blocks of polydimethylsiloxane.

Suitable carbonisable organic polymers include any polymers (including copolymers) which can be at least partially degraded if not fully carbonised at temperature below the softening point of the polymer. Examples of suitable thermosetting polymers include poly(furfuryl alcohol), phenol-formaldehyde and phenolbenzaldehyde resins. Thermosetting resins have the advantage of being highly cross-linked. Examples of suitable thermoplastic polymers include coal tar pitch, poly(vinylidene chloride) and polyacrylonitrile. Poly(vinylidene chloride) cross-links during degradation and polyacrylonitrile can form so called ladder polymers in which adjacent chains cross-bond. Frequently a particle assembly shrinks by from 12 to 20% as a result of carbonisation.

The invention is illustrated by the following example which describes the preparation of a mesoporous carbon and which refers to the drawings of which FIG. 1 is a graph showing the adsorption/desorption hysteresis isotherm at 25° C. obtained when benzene is adsorbed onto and desorbed from a mesoporous carbon according to the invention.

EXAMPLE

Figure 1:
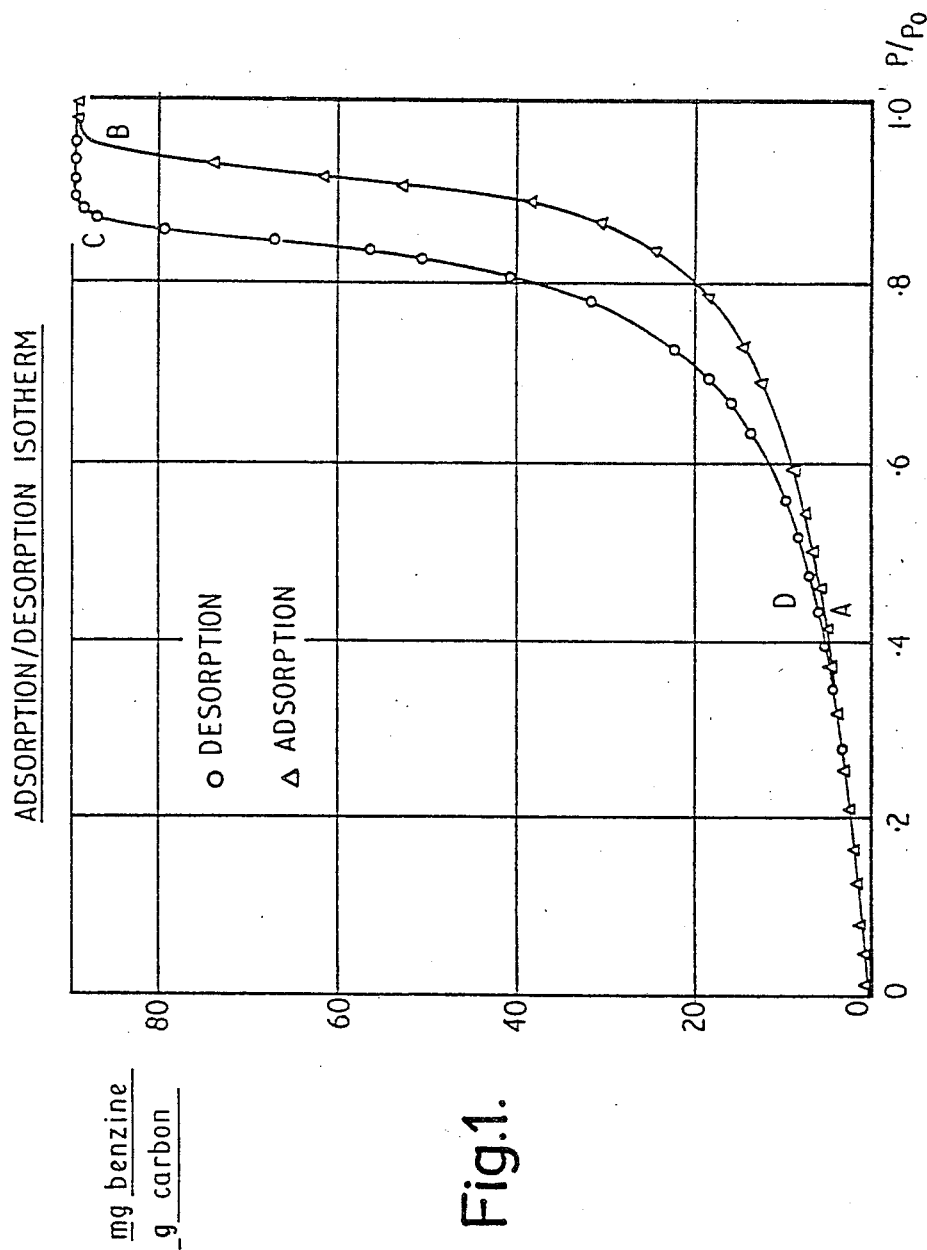
Figure 2:
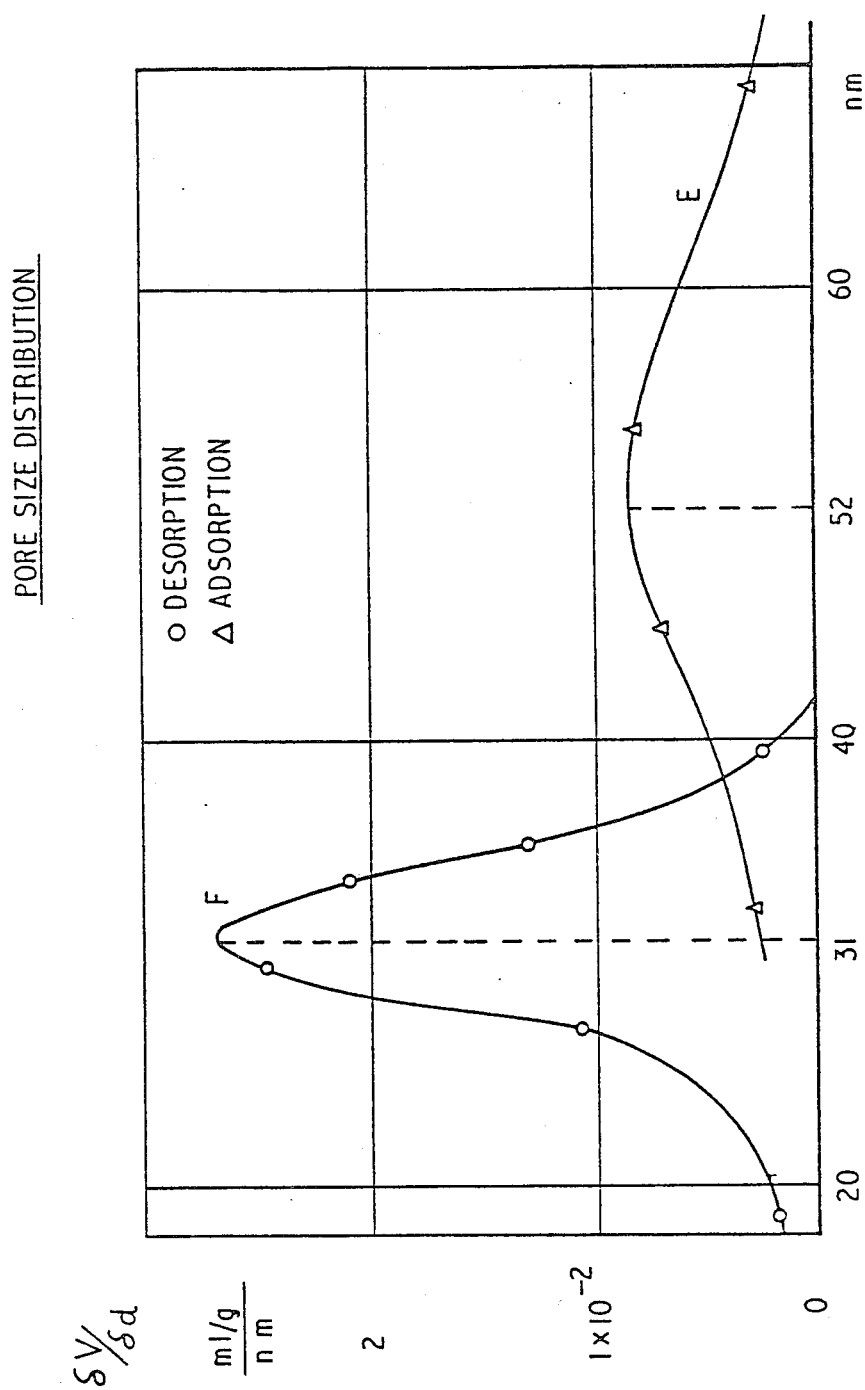
FIG. 2 is a graph derived from FIG. 1 using a conventional pore size analysis technique and showing (a) how the volume attributable to all tetrahedral pores and foramina of a given size varies with vaiation of the given size and (b) how the useful volume attributable to all foramina of a given useful size varies which the variation of the useful size.

An adsorbant mesoporous carbon having pore size characteristics as shown in FIGS. 1 and 2 of the drawings was made as follows:

Firstly a polymeric colloid-stabiliser was prepared by polymerising styrene in tetrahydrofuran under an inert atmosphere at 20° C. The polymerisation was initiated by dilithium naphthalene. The growing polymer was then reacted with hexamethylcyclotrisiloxane to produce a block copolymer comprising a central polystyrene block flanked by blocks or polydimethylsiloxane each terminated by a silanol end group.

Next a colloidal dispersion of polyacrylonitrile inhexane was produced as follows:

Acrylonitrile and benzoyl peroxide initiator were charged to pure hexane containing a small amount of the stabiliser as made above. The hexane was heated under reflux and nuclei of polyacrylonitile began to appear. Extra feeds of acrylonitrile were added drop wise and the particles grew to 249±6 nm diameter whereupon the reaction mixture was cooled to room temperature and further polymerisation prevented. Electron microscopy and chemical microanalysis showed the product to be a colloidal dispersion having a monodisperse particle size in which the particles were virtually spherical. The root mean square deviation of the maximum diameters of the spheroidal particles was between 2 and 3%.

The hexane was evaporated very slowly from the colloidal dispersion by maintaining the dispersion at 26° C. over a period of 60 hours. The deposit of particles of polyacrylonitrile which was obtained was highly irridescent which indicated the presence of very regular close packing of the particles.

To cause degradation, the deposit was heated from 30° C. to 170° C. over a period of 3 hours, maintained at 170° C. for a further 3 hours and then heated slowly to 250° C. and maintained at that temperature overnight. The particles degraded to a form-stable assembly. Finally the degraded assembly was heated to 1600° C. to close micropores, to ensure complete carbonisation, and to sinter lightly together adjacent carbonised particles to produce a more form-stable adsorbant carbon. The carbon produced was a pseudomorph of the deposited assembly of particles of polyacrylonitrile and it was resistant to conversion to graphite. The assembly shrank by about 16% during carbonisation.

FIG. 1 shows the adsorption/desorption hysteresis isotherm at 25° C. for a carbon made according to the example as described above and obtained by subjecting the carbon to a increasing pressure P of benzene (expressed as a fraction of the saturated vapour pressure Po of benzene at 25° C., ie P/Po) so as to cause increasing amounts of benzene (expressed as mg of adsorbed benzene per gram of carbon) to adsorb onto the carbon and then decreasing the pressure of benzene to cause the benzene to desorb from the carbon. Part AB of the hysteresis loop relates to the adsorption process and part CD to the desorption process. It is conventionally supposed that the adsorption part AB of the loop is indicative of the volume of the tetrahedral pores and the foramina whereas the desorption part CD of the loop is indicative of the useful size of the foramina. It should be explained that for reasons which are not properly understood, the hysteresis isotherm fails to detect consequences of the presence of the octahedral pores. It should also be explained that the relationship between the desorption part of the loop and the useful size of the foramina derives from the fact that desorbing benzene is preceeded by a hemispherical meniscus which must of course be small enough to pass through foramina in order to escape from the porous carbon.

By using a conventional pore size analysis technique and the relationship between the adsorption part of the hysteresis loop and the volume of the tetrahedral pores, it is possible to derive a curve which shows how the combined volume of tetrahedral pores attributable to pores of a given so-called "diameter" (ie the diameter of the largest sphere which could notionally be accommodated within the pore) varies as the "diameter" varies. Such a curve is shown in FIG. 2 marked "Curve E". In FIG. 2, this variation in volume per gram of carbon with variation of pore diameter is expressed in ml/g of carbon/nm and pore diameter is expressed in nm. Similarly using the relationship between the desorption part of the hysteresis isotherm and the useful size of foramina it is possible to derive a curve which shows how the combined useful volume attributable to foramina of a given useful size varies as the useful size varies. Such a curve is shown in FIG. 2 as "Curve F". FIG. 2 indicates that the tetrahedral pores have pore "diameters" of around 52 nm and that the foramina have useful sizes of around 31 nm.

Figure 3:
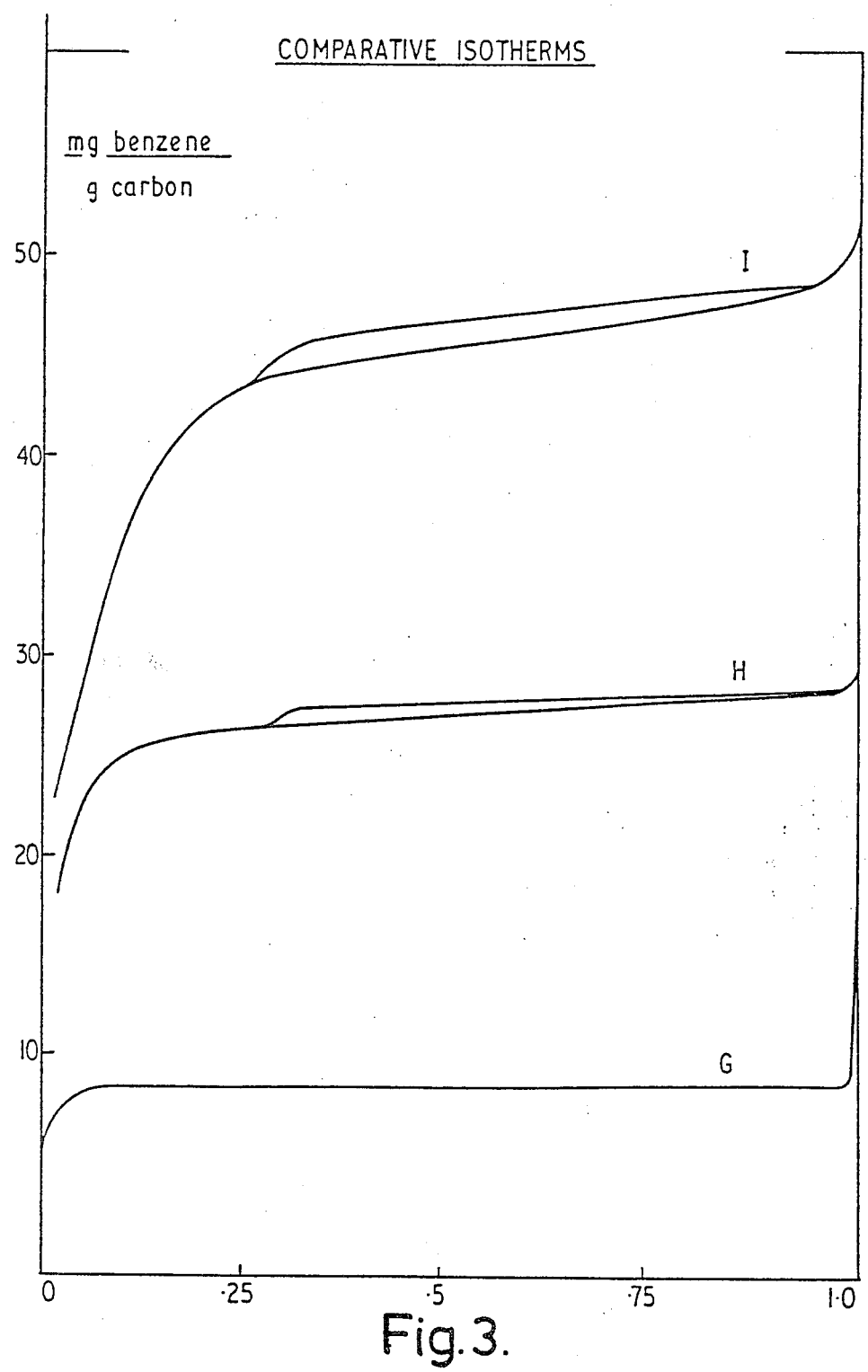
FIG. 3 is a graph which shows by way of comparison three adsorption/desorption hysteresis isotherms at 25° C. obtained using three different known activated carbons.

FIG. 3 shows for the purposes of comparison three adsorption/desorption hysterisis isotherms at 25° C. obtained in the same way as the isotherm shown in FIG. 1 except that three known activated carbons were used instead of the carbon made according to this invention. More particularly, isotherms G, H and I shown in FIG. 3 relate respectively to lightly, moderately and heavily steam activated charcoals prepared from anthracite. The predominance of adsorption at low benzene pressures indicates that most of the porosity of the charcoals is provided by micropores. This contrasts with the substantial absence of adsorbtion at low pressures in FIG. 1 which indicates an absence of micropores. The height of the hysteresis loop shown in FIG. 1 indicates that most of the carbon of the invention is provided by mesopores whereas in FIG. 3 the hysteresis loops indicate the presence of only a few (if any) mesopores.

Two samples of colloidal dispersion made according to the example were caused to deposit from the hexane under more disturbing conditions. In the first case, the nexane was evaporated off very rapidly by heating the dispersion to 80° C. The deposit showed a slight yellowness which is indicative of less regular packing. In the second case the dispersion was heated slowly to 30° C. and evaporation completed over a period of 30 hours. The deposit was white and exhibited a pattern of coloured rings when viewed in sunlight. This indicates more regular packing.

The adsorbant carbons find uses as supports for catalysts, particularly precious metal catalysts such as palladium. Their pre-determinable wide pore structure and pre-determinable degrees of pathway tortuosity enable catalysts to be located deep inside the carbon away from poisons, harmful solvents or other deleterious substances yet the pre-determinability of the pore structure allows the pore size and/or pathway tortuosity to be tailored to favour entry of wanted molecules even when such molecules are quite large. The carbons may be used to support catalysts used in the hydrogenation of fatty oils as described more fully in British patent specifications Nos. 1 578 122 and 1 578 123 the contents of which are herein incorporated by reference. They may also be used in the structure of porous electrodes or as adsorbants, especially for larger molecules.

We claim:

1. An adsorbant carbon comprising a form-stable assembly of a family of contiguous carbon particles wherein the surfaces of adjacent contiguous particles define interstitial pores characterised in that
    (a) the maximum diameters of at least 90% by number of the particles of the family lie in the range 8 to 3000 nm,
    (b) the root mean square deviation of the maximum diameters of the particles of the family is less than 15% and Ser. No. 336,396 - Everett et al.
    (c) in at least one section of the adsorbant carbon, particles are cubic or hexagonal close packed to an extent that the volume of interstitial pores in said section is from 18 to 40% of the volume of said section.

2. A modification of the carbon claimed in claim 1 characterised in that the assembly of particles is such that the volume of the interstitial pores in said section is from above 30 to 40% of the volume of said section.

3. A carbon as claimed in claim 1 characterised in that the assembly of carbon particles comprises one or more families of spheroidal carbon particles wherein
    (a) the maximum diameters of at least 90% by number of the particles of said family lie in the range 3 to 1000 nm.
    (b) the root mean square deviation of the maximum diameters of the particles of said family is less than 15% and
    the number average maximum diameter of the particles of any family differs from that of any other family.

4. A carbon as claimed in claim 1, which is substantially free from micropores in the carbon particles.

5. A method for making adsorbant carbon characterised in that
    (a) a colloidal dispersion of a family of spheroidal particles of carbonisable organic polymer is formed in a liquid wherein the maximum diameters of at least 90% by number of the particles of the family lie in the range 10 to 3500 nm and the root mean square deviation of those maximum diameters within a family is less than 15%.
    (b) the particles are caused to deposit from the liquid by a packing force exerted on them,
    (c) the deposited particles are heated to a temperature which is below the softening point of the polymer but which is high enough to cause at least partial degradation of the polymer and thereby create a form-stable assembly of particles and
    (d) the form-stable assembly is heated to ensure complete carbonisation of the polymer.

6. A method as claimed in claim 5 characterised in that the colloidal dispersion comprises one or more families of spheroidal particles of carbonisable organic polymer wherein
    (a) the maximum diameters of at least 90% by number of the particles of said family lie in the range 10 to 3500 nm,
    (b) the root mean square deviation of those maximum diameters within said family is less than 15% and
    (c) the number average maximum diameter of the particles of any such family differs from that of any other family.

7. A method as claimed in claim 5 or claim 6 characterised in that the packing force is provided by centrifuging.

8. A method as claimed in claim 5 or claim 6 characterised in that the particles are caused to deposit from the liquid by evaporating the liquid and the packing force is exerted on the particles by means of the surface tension of the liquid prior to completion of evaporation.

9. A method according to claim 5 or claim 6 characterised in that the particles are caused to deposit from the liquid by forcing the liquid under hydrostatic pressure through a membrane which is imperveous to the particles whereby the particles deposit on the membrane.

10. A method as claimed in claim 5 or claim 6 characterised in that the form-stable assembly of deposited particles is heated to a temperature of from 700° to 2500° C. to close micropores in the carbon particles and to sinter together contiguous particles.

11. A metallic catalyst supported on an adsorbant carbon as claimed in claim 1.

12. A metallic catalyst supported on an adsorbant carbon prepared by the method of claim 5.

* * * * *